United States Patent [19]

Legrand et al.

[11] Patent Number: 5,152,974
[45] Date of Patent: Oct. 6, 1992

[54] PROCESS FOR THE MANUFACTURE OF A POWDER OF MIXED METAL OXIDES, AND MIXED METAL OXIDE POWDERS

[75] Inventors: Franz Legrand, Quaregnon; Luc Lerot; Patricia De Bruycker, both of Brussels, all of Belgium

[73] Assignee: Solvay S.A., Brussels, Belgium

[21] Appl. No.: 704,837

[22] Filed: May 20, 1991

Related U.S. Application Data

[60] Continuation of Ser. No. 495,418, Mar. 19, 1990, abandoned, which is a division of Ser. No. 372,185, Jun. 26, 1989, Pat. No. 4,929,436.

[30] Foreign Application Priority Data

Mar. 26, 1987 [BE] Belgium .................... 8700311

[51] Int. Cl.$^5$ .................................. C01G 25/02
[52] U.S. Cl. ........................... 423/593; 423/608; 423/71; 423/85; 423/69; 423/600; 423/598; 423/596; 423/622; 106/438
[58] Field of Search .................................. 252/518

[56] References Cited

U.S. PATENT DOCUMENTS 4,543,341 9/1985 Barringer et al. ................... 501/1

FOREIGN PATENT DOCUMENTS

| 177198 | 4/1986 | European Pat. Off. . |
| 199930 | 11/1986 | European Pat. Off. . |
| 59-39724 | 3/1984 | Japan . |
| 59-39725 | 3/1984 | Japan . |
| 60-86022 | 5/1985 | Japan . |
| 1146710 | 7/1986 | Japan . |
| 2241822 | 10/1987 | Japan . |
| 62-256726 | 11/1987 | Japan . |
| 924014 | 10/1980 | U.S.S.R. . |
| 2114991 | 9/1983 | United Kingdom . |
| 21681334 | 6/1986 | United Kingdom . |

OTHER PUBLICATIONS

Sakka, "Gel Method of Making Glass"; Treahse on Materials Science & Tech. vol. 22, pp. 129-233.
Better Ceramica Through Chemistry-Materials Research Society Symposia Proceedings, vol. 32, 1984, Elsevier Science Publishing Col., Inc. Bruce Fegley, et al. Synthesis, characterization, and processing of monosized ceramic powders, pp. 187-197.
"Ceramics", 1961, Reinhold Publishing Corp., p. 1.
KirkOthmer Encyclopedia of Chemical Technology, 3rd Ed., vol. 5, 1979; John Wiley & Sons, U.S.A. pp. 234-236.

*Primary Examiner*—Theodore Morris
*Assistant Examiner*—Edward Squillante
*Attorney, Agent, or Firm*—Stevens, Davis, Miller & Mosher

[57] ABSTRACT

Process for the manufacture of a powder of mixed metal oxides by cohydrolysis of metal alcoholates in the presence of an acidic organic compound and mixed metal oxide powders in which the molar relationships R1 and R2 of a metal oxide to the sum of the metal oxides in the powder and in a particle of the powder are such that $$\frac{R_1 - R_2}{R_1}$$

The process applies especially well to powders of zirconia doped with yttrium oxide or other oxides.

5 Claims, 7 Drawing Sheets

PROCESS FOR THE MANUFACTURE OF A POWDER OF MIXED METAL OXIDES, AND MIXED METAL OXIDE POWDERS

This application is a continuation of application Ser. No. 07/495,418, filed Mar. 19, 1990, which in turn is a divisional of application Ser. No. 07/372,185, filed Jun. 26, 1989, now U.S. Pat. No. 4,929,436.

The invention relates to a process for the manufacture of mixed metal oxide powders.

It is well known that mixed metal oxide powders can be prepared by cohydrolysis of metal alcoholates. For this purpose, dilute solutions of metal alcoholates in an alcohol are generally prepared and these solutions mixed with an alcoholic solution of water. The reaction is generally performed under an inert nitrogen atmosphere, at ambient temperature. At the end of the process the mixed metal oxide powder which has precipitated is collected (Better Ceramics Through Chemistry—Materials Research Society Symposia Proceedings—Vol. 32—1984—Elsevier Science Publishing Co., Inc.—Bruce Fegley et al: "Synthesis, characterization, and processing of monosized ceramic powders", pages 187 to 197; U.S. Pat. No. 4,543,341). This known process has been designed for the production of metal oxide powders of very high chemical purity, intended for use in ceramic materials.

BRIEF SUMMARY OF THE INVENTION

As a general rule, the performance of ceramic materials is related to the homogeneity of the mixed metal oxide powders employed. For this purpose, it has now been found that the morphology of the powders obtained by cohydrolysis of metal alcoholates, in particular their homogeneity, can be influenced by the conditions under which the cohydrolysis is carried out. The invention consequently aims to provide a process for the manufacture of mixed metal oxide powders which are in the form of uniform particles and exhibit high chemical homogeneity.

Consequently, the invention relates to a process for the manufacture of a powder of mixed metal oxides, according to which the cohydrolysis of metal alcoholates is carried out in the presence of an acidic organic compound containing more than six carbon atoms in its molecule.

Within the scope of the invention, a mixed metal oxide powder is intended to denote a powder which contains oxides of at least two different metals. According to the invention, the powder may contain more than two different metal oxides.

In the process according to the invention, the metal alcoholates are all compounds containing at least one metal bonded via an oxygen atom to a hydrocarbon group such as an aromatic group or a saturated or unsaturated, linear or cyclic aliphatic group, which is unsubstituted or partially or completely substituted. Metal alcoholates containing aliphatic groups are especially recommended; those containing unsubstituted saturated aliphatic groups are preferred, such as, for example, methyl, ethyl, n-propyl, isopropyl, n-butyl and isobutyl groups.

In the process according to the invention, the hydrocarbon groups of the metal alcoholates employed may be identical or different.

The cohydrolysis consists in decomposing the metal alcoholates simultaneously by means of water to produce the corresponding hydrated metal oxides and an alcohol or mixture of alcohols. It is immaterial whether the operation is carried out with an excess or a deficiency of water relative to the quantity which is strictly required to decompose all the alcoholates. The cohydrolysis is controlled, in a manner known per se, so that the metal oxides precipitate in the form of a powder, without bulk gelling of the reaction mixture resulting from the hydrolysis.

Figure 1:
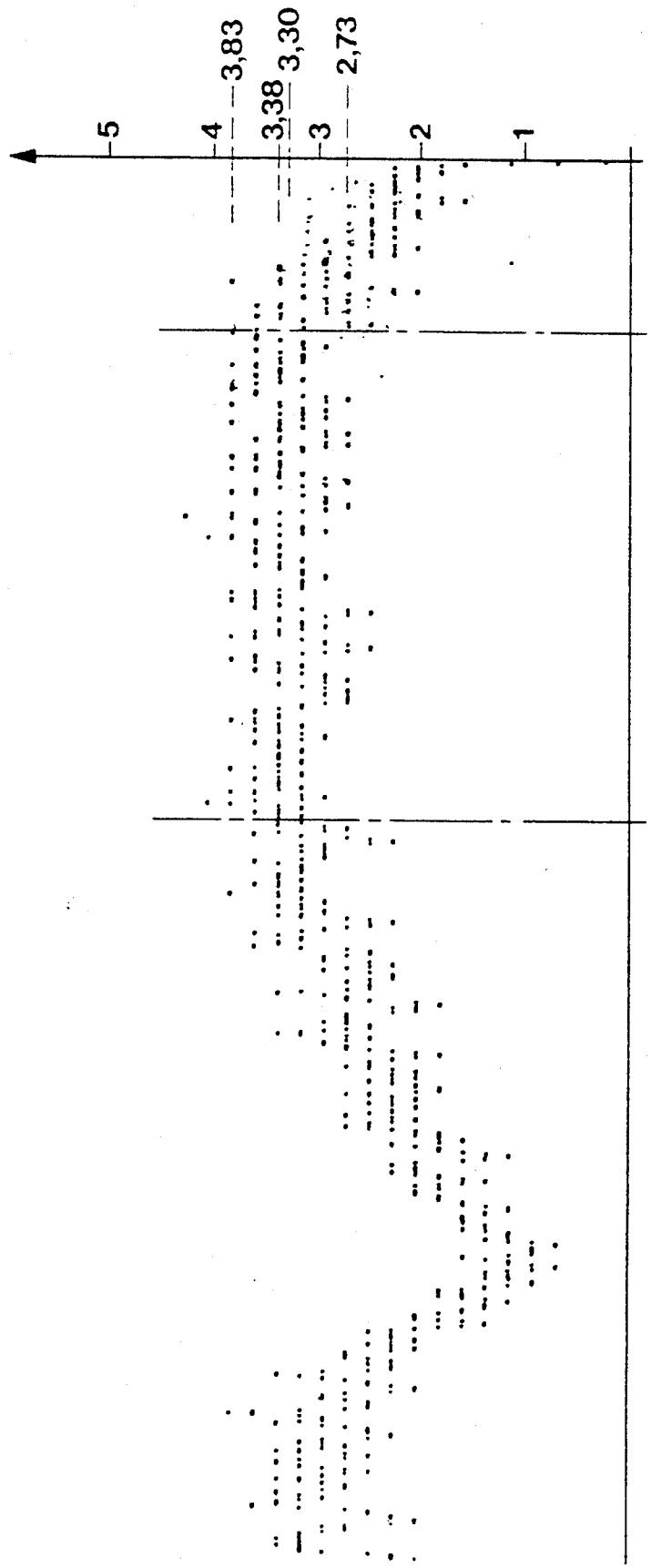
FIG. 1 is a diagram relating to a microanalysis along a particle.

According to the invention, the cohydrolysis is performed in the presence of an acidic organic compound.

DETAILED DESCRIPTION OF THE INVENTION

An acidic organic compound is intended to denote an organic acid or a derivative of an organic acid. Saturated and unsaturated carboxylic acids and derivatives thereof are especially recommended. It is advisable to choose acids or acid derivatives containing more than six carbon atoms in their molecule. Carboxylic acids which have been found especially advantageous are those containing at least eight carbon atoms in their molecule, such as octanoic, lauric, palmitic, isopalmitic, oleic and stearic acids. Carboxylic acids containing more than ten carbon atoms in their molecule are preferred.

It has been observed that the acidic organic compound affects the morphology of the mixed metal oxide powder, particularly by inhibiting the agglomeration of the particles and by imparting a spherical outline to the latter. As a general rule, it should be employed in sufficient quantity for its action on the powder morphology to be evident, while at the same time avoiding exceeding a threshold beyond which its effect on the quality of the powder could be negative. In practice, the optimum quantity of acidic organic compound which it is advisable to use depends on many parameters which include, in particular, the acidic organic compound selected (chiefly the length of its carbon chain), the metal alcoholates employed, as well as the operating conditions; it must be determined for each particular case as a function of the required quality of the powder morphology. In general, it is advisable to ensure a molar relationship between the acidic organic compound and the mixture of metal alcoholates of at least $10^{-3}$; in the case of a carboxylic acid, the preferred molar relationships are those between 0.005 and 3; molar relationships of between 0.015 and 0.35 are suitable.

The cohydrolysis may be carried out in the surrounding air. However, in order to avoid the risk of an uncontrolled decomposition of the metal alcoholates it is preferred, according to a particular embodiment of the process according to the invention, to perform the cohydrolysis under a gaseous atmosphere devoid of moisture. Dry, water-free air, nitrogen and argon are examples of atmospheres which can be employed in this embodiment of the invention. In principle, temperature and pressure are not critical. In general, in most cases, it is possible to work at ambient temperature and at normal atmospheric pressure.

In performing the process according to the invention, it is recommended to produce a homogeneous mixture of the metal alcoholates, water and acidic organic compound as quickly as possible, before nucleation begins. For this purpose, the alcoholates and the water are advantageously used in the form of organic solutions. Where appropriate, it is convenient for the organic solvent of the alcoholates to be free from water. It is advisable, furthermore to avoid the presence of solid particles in the organic solutions of the alcoholates and of water. Identical or different organic solvents may be employed for each alcoholate and for water. In the case of different organic solvents, it is generally advisable that they should be miscible. It is advisable, furthermore, to choose organic solvents in which the metal oxides to be produced are not soluble. Alcohols and their derivatives are generally suitable, particularly methanol, ethanol, n-propanol, isopropanol, n-butanol and isobutanol.

The optimum degrees of dilution of the alcoholates and the water in their respective organic solvents depend on various factors, particularly on the alcoholates employed, on the quantity and the nature of the acidic organic compound chosen, on the working temperature, on the degree of turbulence of the reaction mixture and of the desired quality of the metal oxide powder; they must be determined for each particular case by routine work in the laboratory. As a general rule, it is recommended that the organic solution of each alcoholate or of the mixture of alcoholates and the organic solution of water contain less than 2 moles of metal alcoholate per liter and less than 5 moles of water per liter respectively. Molar concentrations which are especially advantageous are those of between 0.05 and 1 in the case of the metal alcoholate solution and between 0.1 and 3 in the case of the organic water solution.

In the process according to the invention, the metal oxides are coprecipitated by cohydrolysis of the metal alcoholates in the presence of the acidic organic compound. Various operating procedures can be used for this purpose.

According to a first operating procedure, each metal alcoholate (for example in the form of an organic solution), water (preferably in the dissolved form in an organic solvent) and the acidic organic compound are introduced separately but simultaneously into a reaction chamber. In an alternative form of this operating procedure of the process, a homogeneous mixture of the metal alcoholates is first produced, for example by dissolving them in a common solvent, before water and the organic compound are added thereto.

According to a second operating procedure, a homogeneous mixture of the metal alcoholates is first produced, the acidic organic compound is added to this mixture or to water, and then the water and the mixture of alcoholates are combined.

In each of these operating procedures it is possible to operate as described in Patent Application GB-A-2,168,334.

At the end of the cohydrolysis reaction a powder of fine particles is collected, consisting of a mixture of metal oxides in the amorphous form, hydrated to a greater or lesser degree. The powder consists essentially of generally spherical particles with a diameter not exceeding 5 microns, and usually of between 0.05 and 2 microns. It is generally associated with the moisture and the organic residues from the hydrolysis reaction, such as organic solvents and the acidic organic compound.

The powder may optionally be subjected to a drying operation and a heat treatment at an appropriate temperature, to remove the acidic organic compound, the water and the organic solvents which it contains. The heat treatment may be regulated in order to control the porosity or to get rid of it completely. It may furthermore be regulated in order to initiate a crystallization of the metal oxides.

The process according to the invention can be applied to the production of powdered oxides of all known metals such as, for example, titanium oxide powders doped with a metal oxide or a mixture of metal oxides such as tantalum, niobium, barium, copper and strontium oxides, silicon oxide powders doped with boron oxide and zirconium oxide powders doped with aluminium oxide. It is especially suitable for the production of mixed metal oxide powders intended for use in ceramic materials which, by definition, are nonmetallic inorganic materials whose use beginning with a powder requires high-temperature treatments, such as fusion or sintering treatments (P. William Lee—"ceramics"—19-61—Reinhold Publishing Corp.—page 1; Kirk Othmer Encyclopedia of Chemical Technology—Third edition—Volume 5—1979; John Wiley & sons, U.S.A.—pages 234 to 236: "Ceramics, scope"). In particular, the process according to the invention finds an advantageous application in the production of mixed powders of oxides of metals belonging to the rare-earths groups and to groups II, III and IV of the Periodic Table of the Elements; it can be applied successfully to the production of stabilized zirconia powders containing at least 50 mol % (for example between 75 and 95%) of zirconium oxide.

The powders obtained using the process according to the invention and most especially zirconia powders stabilized with at least one other metal oxide are distinguished by a remarkable chemical uniformity, not only at the overall powder scale but also on the particle scale. Furthermore, the powders obtained are practically free from agglomerates and their particle size distribution is relatively narrow.

The invention consequently also relates to mixed metal oxide powders in which the mean molar relationship ($R_1$) of each metal oxide to the sum of the metal oxides in the powder and the means molar relationship ($R_2$) of the said metal oxide to the sum of the metal oxides in a particle of the powder are such that.

$$\frac{|R_1 - R_2|}{R_1} \leq 0.30$$

The invention relates in particular to mixed metal oxide powders in which, in the case of each particle of the powder and in the case of each metal oxide of which it consists, the abovementioned molar relationship $R_2$ and the molar relationship ($R_3$) of the said metal oxide to the sum of the metal oxides at any point in the particle are such that:

$$\frac{|R_2 - R_3|}{R_2} \leq 0.30$$

Mixed metal oxide powders in accordance with the invention are those in which the abovementioned molar relationships $R_1$, $R_2$ and $R_3$ are such that:

$$0.01 \leq \frac{|R_1 - R_2|}{R_1} \leq 0.30$$

and/or $$0.05 \leq \frac{|R_2 - R_3|}{R_2} \leq 0.30$$

The mixed metal oxide powders according to the invention generally consist of spherical particles whose diameter is between 0.05 and 2 microns, preferably between 0.2 and 0.7 micron.

The preferred powders according to the invention are those in which the metal oxides of which they consist are metal oxides selected from those of the rare-earths group and of groups II, III and IV of the Periodic Table of the Elements. These powders find advantageous applications in the use of ceramic materials. Examples of such powders are those of zirconium oxide doped with at least one oxide of at least one other metal belonging to one of the abovementioned groups, for example titanium, yttrium, calcium, magnesium, barium, neodymium and lanthanum. Among these powders in accordance with the invention the most advantageous are those containing at least 50 mol %, preferably between 75 and 98 mol %, of zirconium oxide.

Powders according to the invention are those obtained using the process according to the invention, as defined above. The invention relates in particular to mixed metal oxide powders in which the abovementioned relationship $|R_1-R_2|:R_1$ is less than 0.25 and powders in which the abovementioned relationship $|R_2-R_3|:R_2$ is less than 0.20, especially powders for which:

$$0.03 \leq \frac{|R_1 - R_2|}{R_1} \leq 0.20$$

and/or $$0.08 \leq \frac{|R_2 - R_3|}{R_2} \leq 0.18$$

A few examples whose description will follow are used to illustrate the invention. These examples are given with reference to the attached drawings.

FIG. 1 is a diagram relating to a microanalysis along a particle, in a microtome section of a powder according to the invention.

FIG. 2 to 7 are six photographic reproductions of doped zirconia powders, in accordance with the invention, at a magnification of 20,000×.

The examples relate to test manufacture of zirconia powders doped with another metal oxide, according to the following operating process, in accordance with the invention.

An organic solution of a zirconium alcoholate and an organic solution of an alcoholate of another metal were introduced separately into a reaction chamber maintained under anhydrous nitrogen atmosphere. After a maturing time of a few minutes, sufficient to produce a homogeneous solution, a determined quantity of carboxylic acid was added to the latter and the resultant mixture was subjected to moderate stirring for a few minutes. Then, while the mixture continued to be vigorously stirred, a defined quantity of an organic solution of water was added thereto in a single portion. The stirring was regulated so as to produce a homogeneous reaction mixture before the beginning of nucleation. The reaction mixture was then subjected to a maturing for 2 hours with moderate stirring. At the end of maturing, the reaction mixture was centrifuged and the mixed metal oxide powder was collected, was washed with anhydrous alcohol and was then dried with a stream of air at ambient temperature.

In the examples, the means particle diameter of the powders was calculated from measurements on the photographic reproductions, the mean diameter being defined by the following relationship (G. Herdan—"Small particle statistics"—2nd edition—1960—Butterworths pages 10 and 11):

$$d = \frac{\Sigma n_i d_i}{\Sigma n_i}$$

where $n_i$ denotes the number of particles of the diameter $d_i$.

EXAMPLE 1

This example relates to the manufacture of a powder of zirconia doped with yttrium oxide. It is characterized by the following operating conditions:
organic solutions of metal alcoholates:
 100 ml of a 0.2M solution of zirconium n-butoxide in ethanol,
 3 ml of a 0.4M solution of yttrium isopropoxide in isopropanol,
carboxylic acid: $1.6 \times 10^{-3}$ mole of oleic acid,
organic solution of water: 100 ml of a 0.7M solution of water in ethanol,
working temperature: 25° C.

Figure 2:
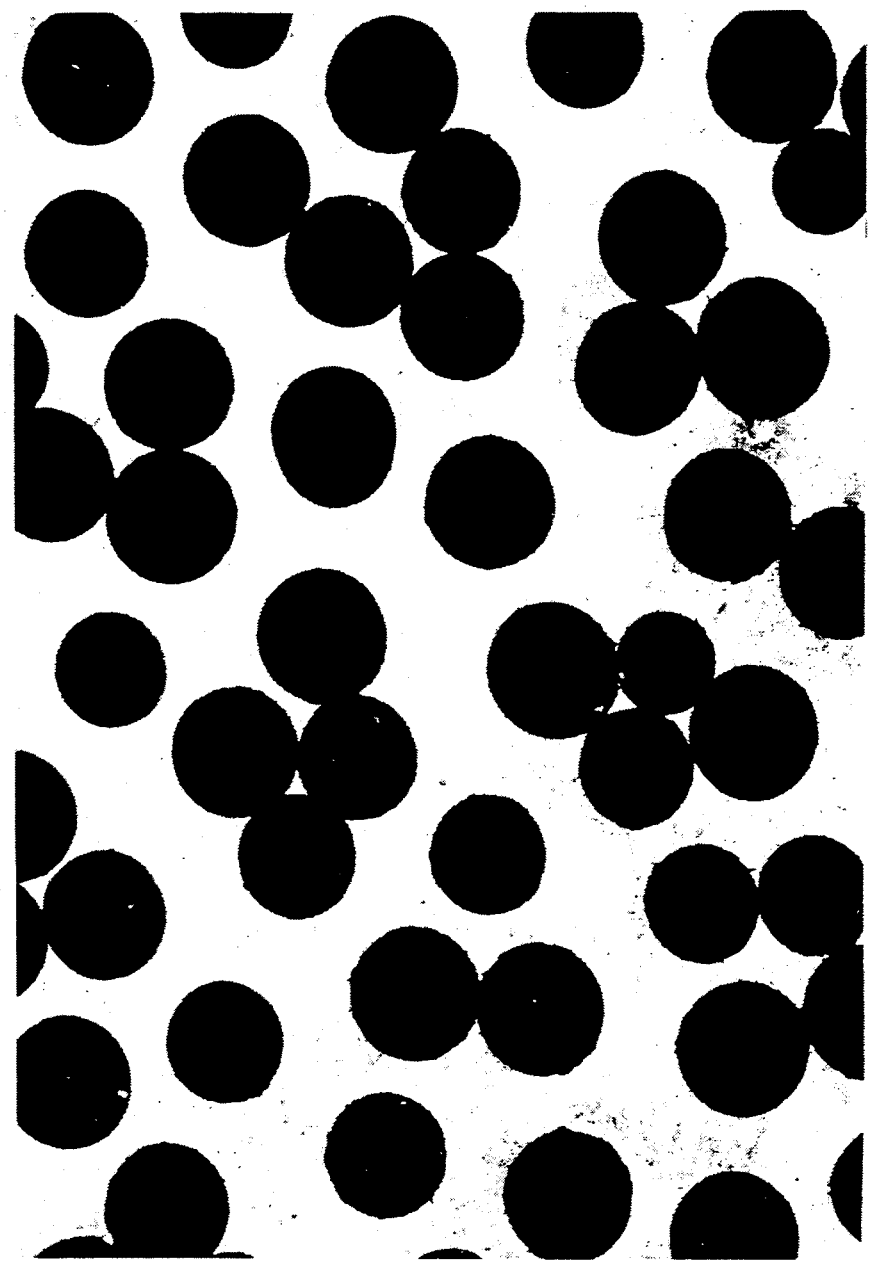
FIGS. 2-7 are photographic reproductions of zirconia powder.

The powder obtained is shown in FIG. 2. It has a mean particle diameter of 0.87 micron.

Furthermore, the following measurements of the molar relationship:

$$R = \frac{\text{moles } Y_2O_3}{\text{moles } Y_2O_3 + \text{moles } ZrO_2}$$

have been carried out
 (a) on a sample of the whole powder,
 (b) on five particles taken at random from the powder, and
 (c) in different regions along a diameter of a particle of the powder, within a microtome section approximately 0.1 micron in thickness.

Measurement (a) was carried out using chemical analysis.

Measurement (b) was carried out by x-ray microanalysis using a scanning electron microscope supplied by Cambridge, series 200, equipped with an energy diffraction x-ray microanalysis device supplied by Tracor.

Measurement (c) was obtained by x-ray microanalysis with a Siemens Model 102 transmission microscope equipped with an energy diffraction x-ray microanalysis device supplied by Kevex.

The results of measurements (a) and (b) are listed in the table which follows.

|  | Molar relationship $\frac{Y_2O_3}{Y_2O_3 + ZrO_2}$ |
|---|---|
| (a) Total sample: R | 3.3 |

-continued

|  | Molar relationship $\frac{Y_2O_3}{Y_2O_3 + ZrO_2}$ |
| --- | --- |
| (b) On five particles: |  |
| particle No. 1: $R_2$ | 3.1 |
| particle No. 2: $R_2$ | 3.1 |
| particle No. 3: $R_2$ | 2.9 |
| particle No. 4: $R_2$ | 2.9 |
| particle No. 5: $R_2$ | 3.8 |
| mean: $R_1$ | 3.2 |

The results of measurement (c) are reproduced in the diagram in FIG. 1 which shows the distribution of the radiation intensity relating to the detection of yttrium. The horizontal axis of the diagram represents diagrammatically the scanning line of the analyser and the ordinate axis expresses the molar concentration of yttrium oxide (molar relationship $R_3$ defined above).

An examination of the Table and of the diagram in FIG. 1 leads to the following conclusions:

in the case of the sample of the five particles:

$$0.03 \leq \frac{|R_1 - R_2|}{R_1} \leq 0.19$$

along the diameter of a particle:

$$0.08 \leq \frac{|R_2 - R_3|}{R_2} \leq 0.17$$

EXAMPLE 2

This example differs from Example 1 in the following operating conditions:
organic solutions of metal alcoholates:
  100 ml of a 0.2M solution of zirconium n-propoxide in propanol,
  3 ml of a 0.4M solution of yttrium isopropoxide in isopropanol,
carboxylic acid: $4.8 \times 10^{-3}$ mole of oleic acid,
organic solution of water: 100 ml of a 1.25M solution of water in propanol, and
working temperature: 25° C.

Figure 3:
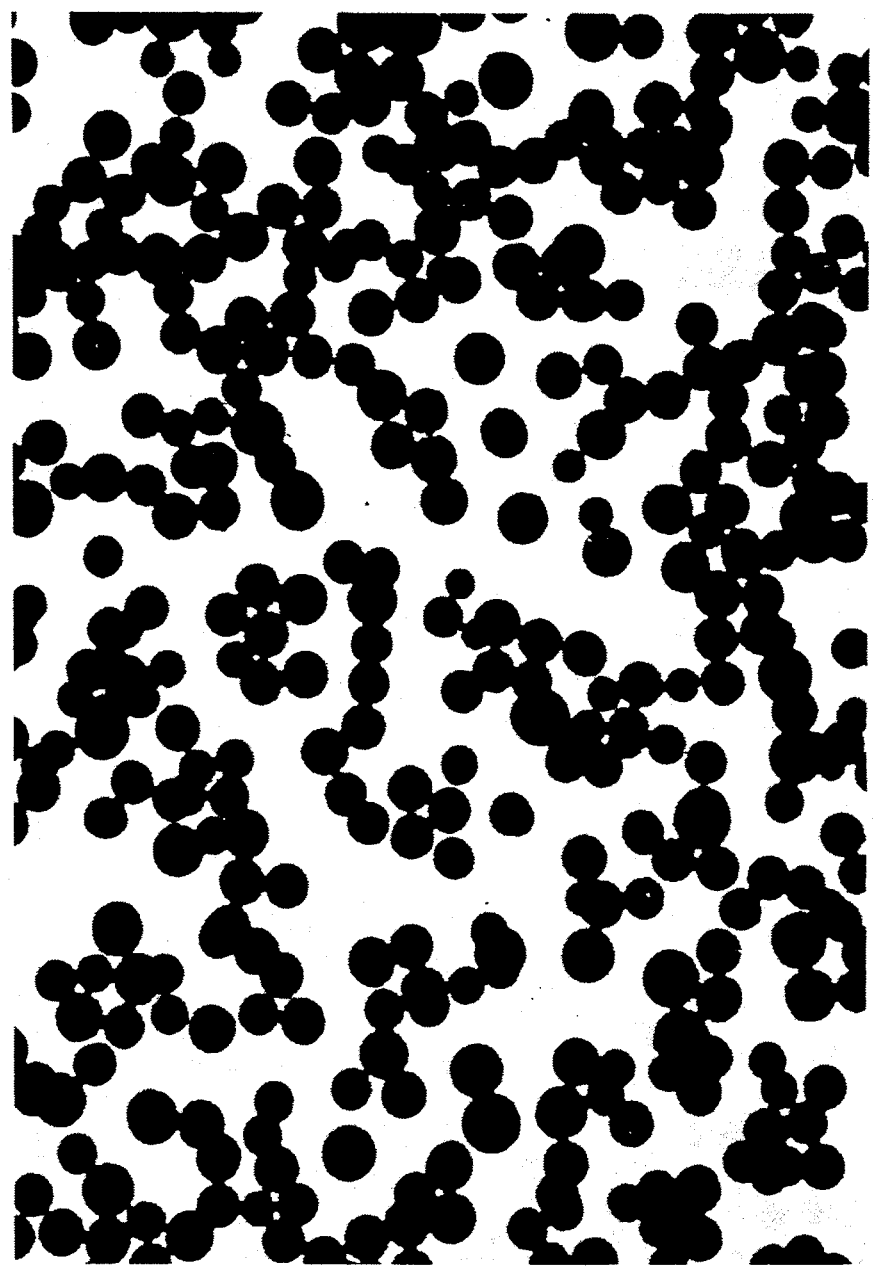

The powder obtained is shown in FIG. 3. It has a mean particle diameter of 0.32 micron.

EXAMPLE 3

This example deals with the preparation of a powder of zirconia doped with titanium dioxide. It is characterized by the following operating parameters:
organic solutions of metal alcoholates:
  100 ml of a 0.2M solution of zirconium n-propoxide in n-propanol,
  4 ml of a 0.5M solution of titanium n-propoxide in n-propanol,
carboxylic acid: $3.2 \times 10^{-3}$ mole of oleic acid,
organic solution of water: 100 ml of a 0.7M solution of water in n-propanol, and
working temperature: 25° C.

Figure 4:
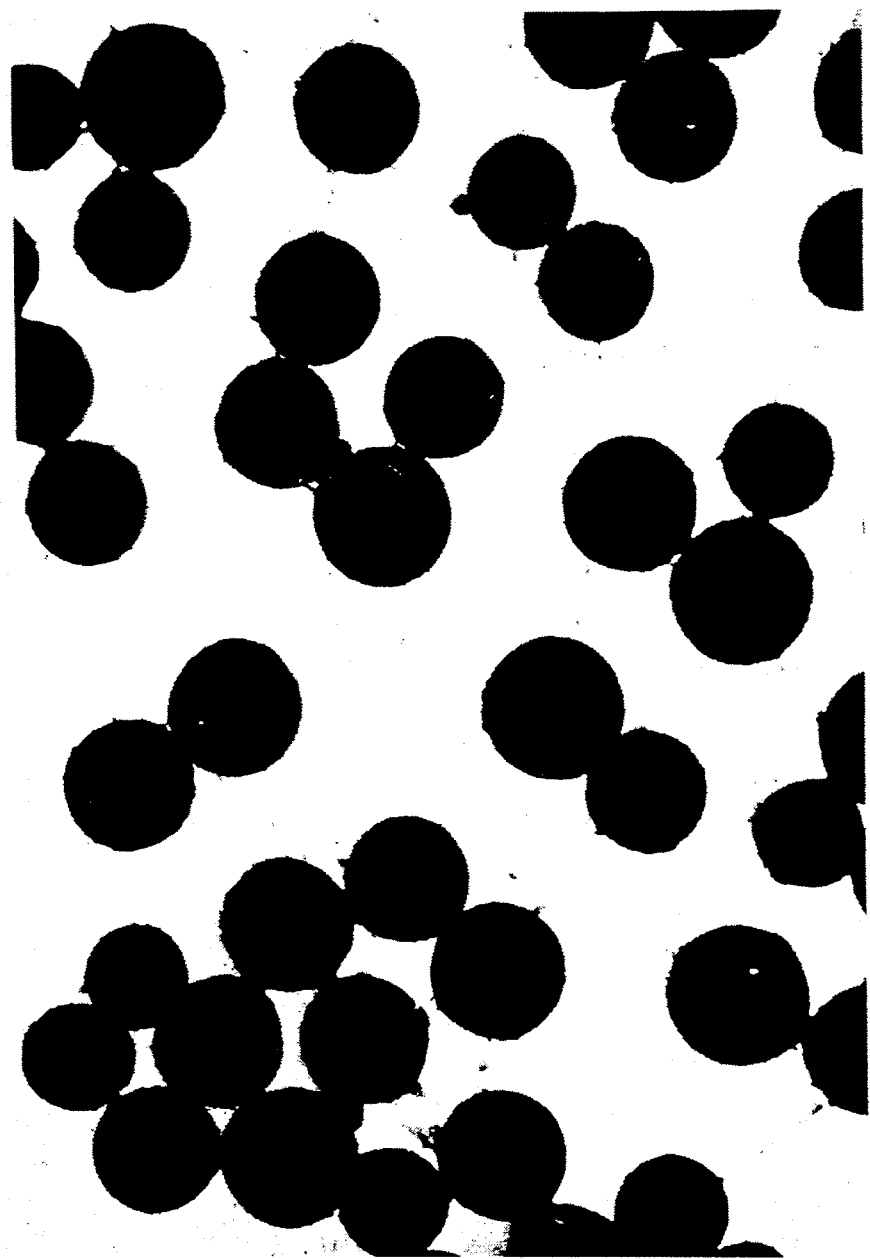

FIG. 4 shows a sample of the powder obtained. The latter consists of spherical particles of zirconia and of titanium dioxide, whose mean diameter is 0.88 micron.

EXAMPLE 4

In this example, a powder of zirconia and calcium oxide was prepared. To this end, the following operating conditions have been employed:
organic solutions of metal alcoholates:
  30 ml of a 0.2M solution of zirconium n-propoxide in n-propanol,
  30 ml of a solution of a mixture of zirconium n-butoxide and n-propoxide (0.46M) and calcium ethoxide (0.08M) in a mixture of n-propanol and isopropanol,
carboxylic acid: $4.8 \times 10^{-3}$ mole of oleic acid,
organic solution of water: 100 ml of a 0.7M solution of water in n-propanol, and
working temperature: 70° C.

In carrying out this example, the two solutions of metal alcoholates were first mixed and then the resultant mixture was diluted with 20 ml of isopropanol before oleic acid was introduced into it. Subsequent procedure was then as described above for Examples 1 to 3.

Figure 5:
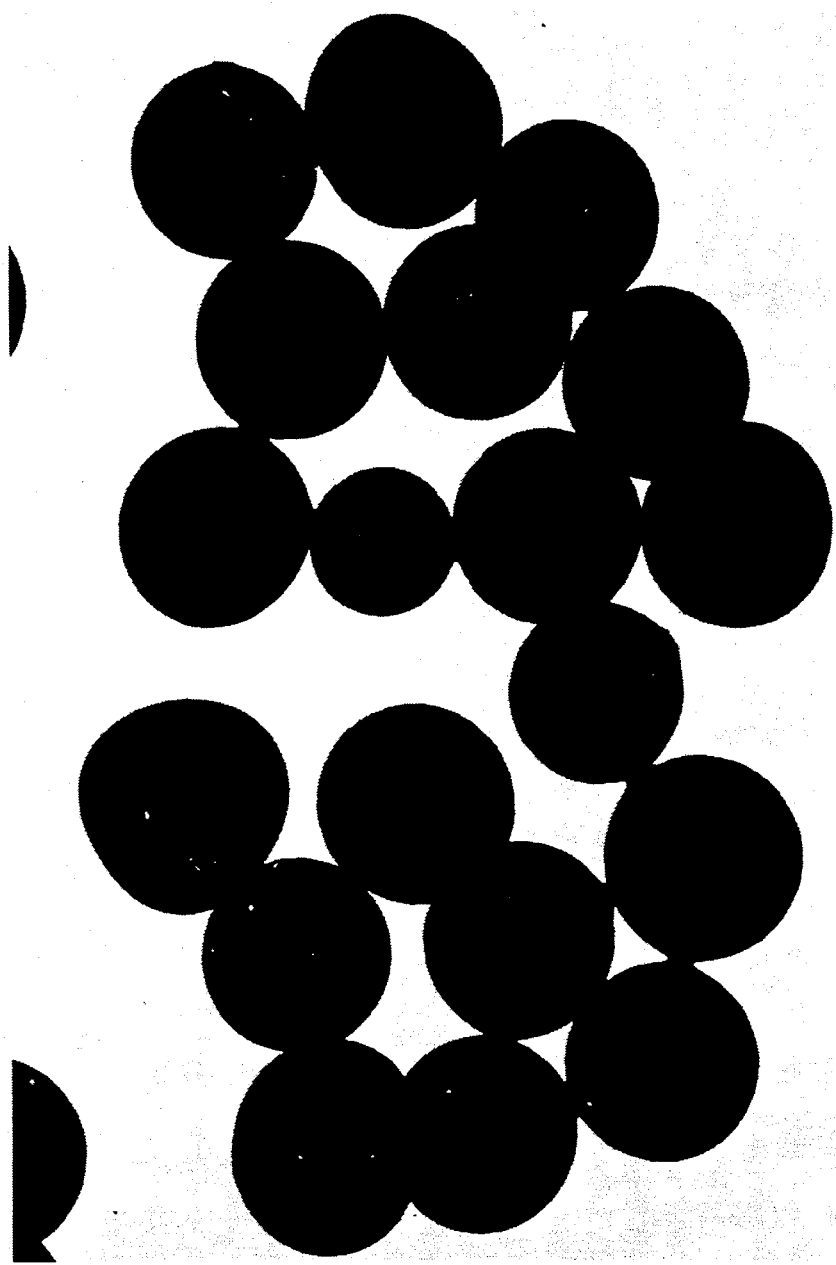

FIG. 5 shows a sample of the powder obtained. The latter is in the form of spherical particles whose mean diameter is 1.2 micron.

EXAMPLE 5

In this example, a powder of zirconium oxide and magnesium oxide was prepared. The procedure was as for Example 1, with the following reactants:
organic solutions of metal alcoholates:
  50 ml of a 0.2M solution of zirconium n-propoxide in n-propanol,
  15 ml of a solution of zirconium n-propoxide (0.67M) and magnesium ethoxide (0.12M) in n-propanol,
carboxylic acid: $3.2 \times 10^{-3}$ mole of oleic acid,
organic solution of water: 100 ml of a 0.7M solution of water in n-propanol, and
working temperature: 50° C.

Figure 6:
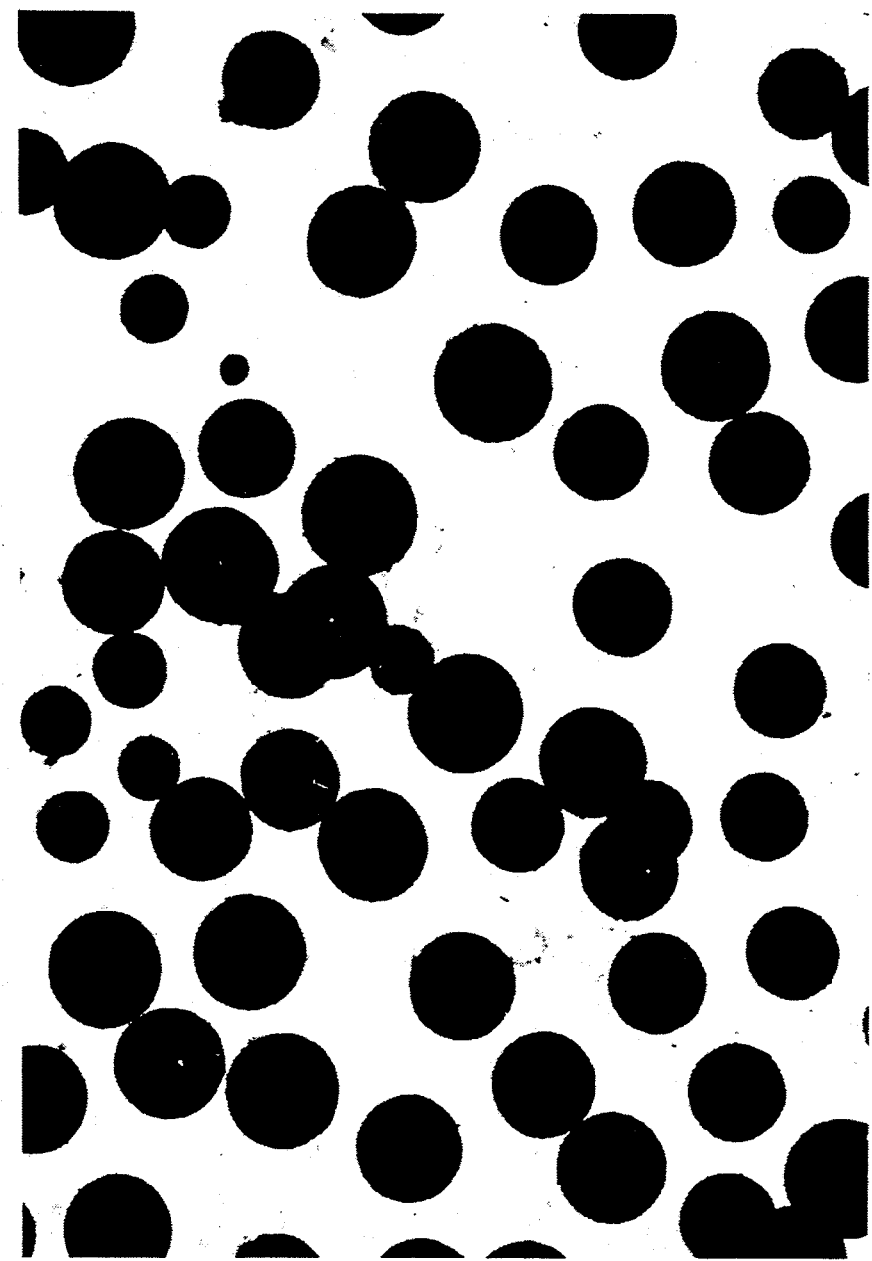

A sample of the powder obtained is reproduced in FIG. 6.

The former consists of spherical particles whose mean diameter is 0.68 micron.

EXAMPLE 6

This example relates to the preparation of a powder of zirconia doped with neodymium oxide.

The procedure was as described above for Example 1, with the following reactants being employed:
organic solutions of metal alcoholates:
  50 ml of a 0.2M solution of zirconium n-propoxide in n-propanol,
  40 ml of a 0.06M solution of neodymium isopropoxide in isopropanol,
carboxylic acid: $2.4 \times 10^{-3}$ mole of oleic acid,
organic solution of water: 50 ml of a 1.25M solution of water in n-propanol, and
working temperature: 50° C.

Figure 7:
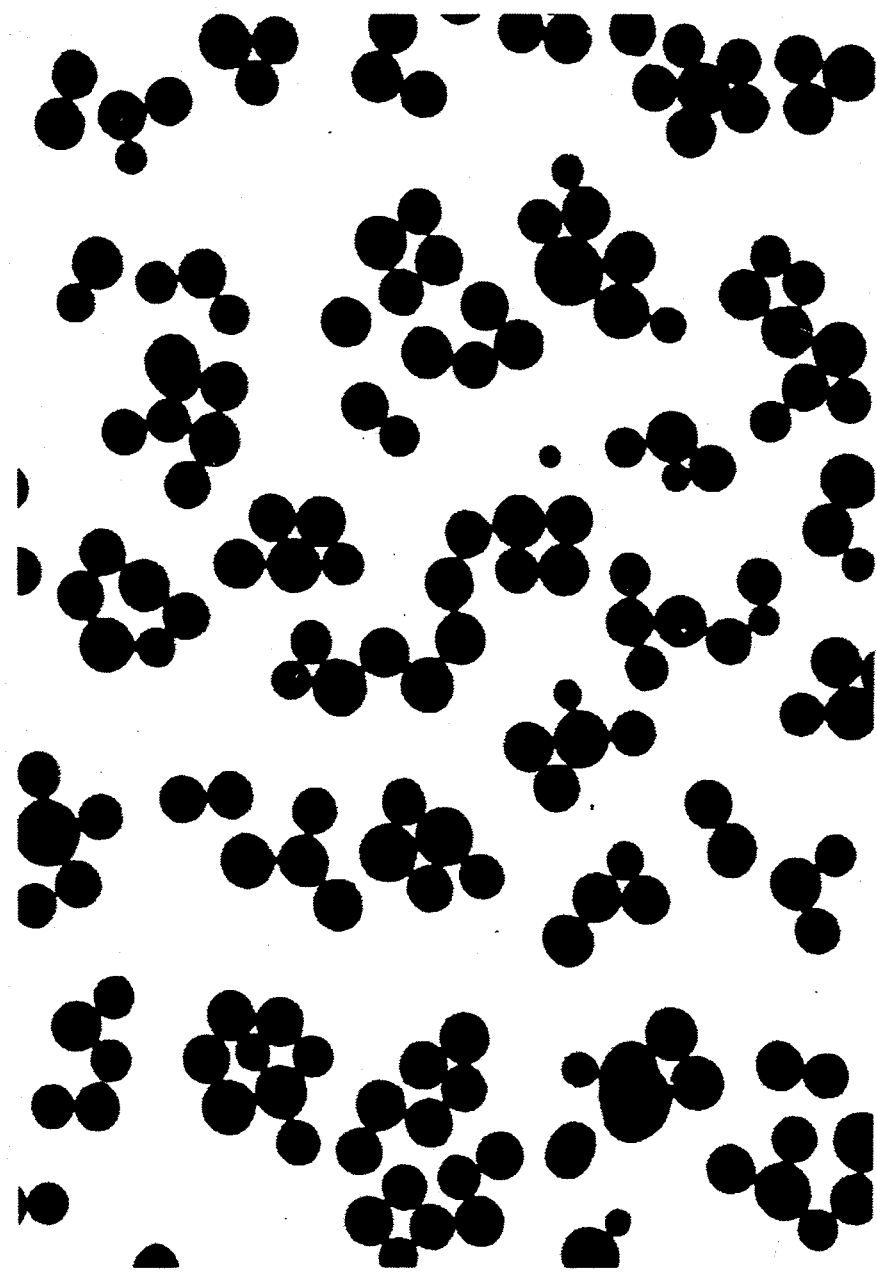

FIG. 7 shows a sample of the powder obtained. The latter consists of spherical particles of zirconium oxide and neodymium oxide, whose mean diameter is 0.3 micron.

We claim:

1. A mixed metal oxide powder wherein, for each single metal oxide of the mixed metal oxide, the mean molar relationship ($R_1$) of said single metal oxide to the mixed metal oxide in the powder and the mean molar relationship ($R_2$) of said each single metal oxide to the mixed metal oxide in a particle of the powder are such that:

$$\frac{R_1 - R_2}{R_1} \leq 0.30$$

the mixed metal oxide powder consisting of spherical particles having a diameter of between 0.05 and 2 microns, and the metal oxides are selected from the group consisting of rare earth metals and metals of Groups II, III and IV of the Periodic Table of Elements.

2. Powders according to claim 1, wherein for each particle of the powder, said molar relationship $R_2$ and the molar relationship $R_3$ of said single metal oxide to the mixed metal oxide at a point in said each particle are such that:

$$\frac{|R_2 - R_3|}{R_2} \leq 0.03.$$

3. Powders according to claim 1, wherein said relationships $R_1, R_2$ and $R_3$ are such that $$0.03 \leq \frac{|R_1 - R_2|}{R_1} \leq 0.20$$

and/or $$0.08 \leq \frac{|R_2 - R_3|}{R_2} \leq 0.18.$$

4. Powders according to claim 1, containing between 75 and 98 mol % of zirconium oxide.

5. Powders according to claim 1 prepared by a process comprising the manufacture of a powder of mixed metal oxides, comprising dissolving metal alcoholates in an organic solvent to provide an organic solution of metal alcoholates, treating the organic solution of the metal alcoholates with water in the presence of an acidic organic compound containing more than six carbon atoms in its molecule to cohydrolyze the metal alcoholates and precipitate mixed metal oxides as a powder without any bulk gelling, and collecting said powder as particles having a diameter not exceeding 5 microns.

* * * * *